(No Model.) 2 Sheets—Sheet 2.

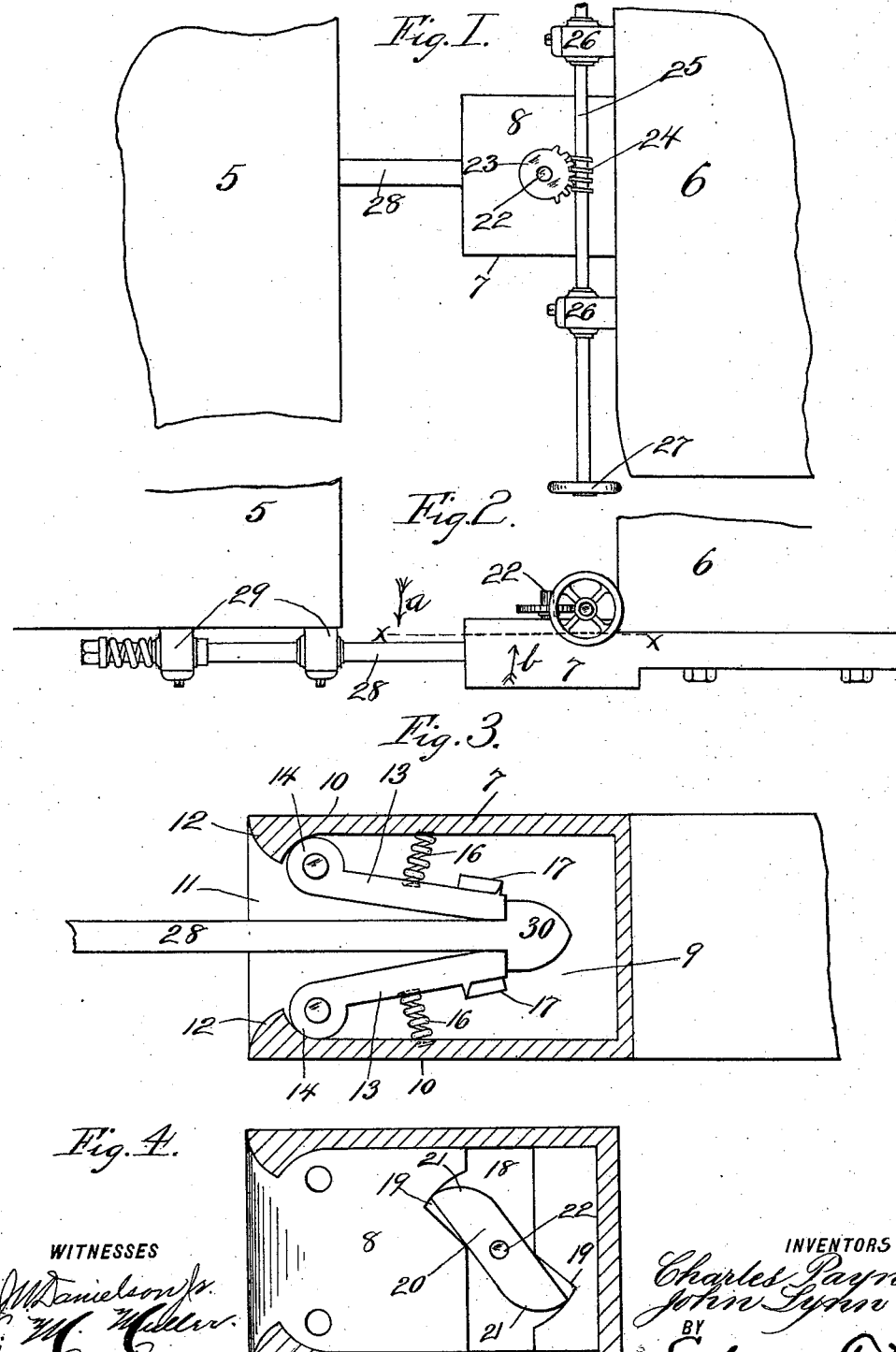

C. PAYNE & J. LYNN.
CAR COUPLING.

No. 577,205. Patented Feb. 16, 1897.

WITNESSES

INVENTORS
Charles Payne
John Lynn
BY
Edgar Tate & Co
ATTORNEYS.

UNITED STATES PATENT OFFICE.

CHARLES PAYNE AND JOHN LYNN, OF NEW YORK, N. Y.

CAR-COUPLING.

SPECIFICATION forming part of Letters Patent No. 577,205, dated February 16, 1897.

Application filed July 28, 1896. Serial No. 600,790. (No model.)

*To all whom it may concern:*

Be it known that we, CHARLES PAYNE and JOHN LYNN, citizens of the United States, and residents of New York, in the county of New York and State of New York, have invented certain new and useful Improvements in Car-Coupling Devices, of which the following is a specification, reference being had to the accompanying drawings, forming a part thereof, in which similar numerals of reference indicate corresponding parts wherever found throughout the several views.

This invention relates to car-couplers, and the object thereof is to provide an improved automatic device of this class which is simple in construction and operation and which is fully disclosed in the following specification, of which the accompanying drawings form a part, in which—

Figure 5:
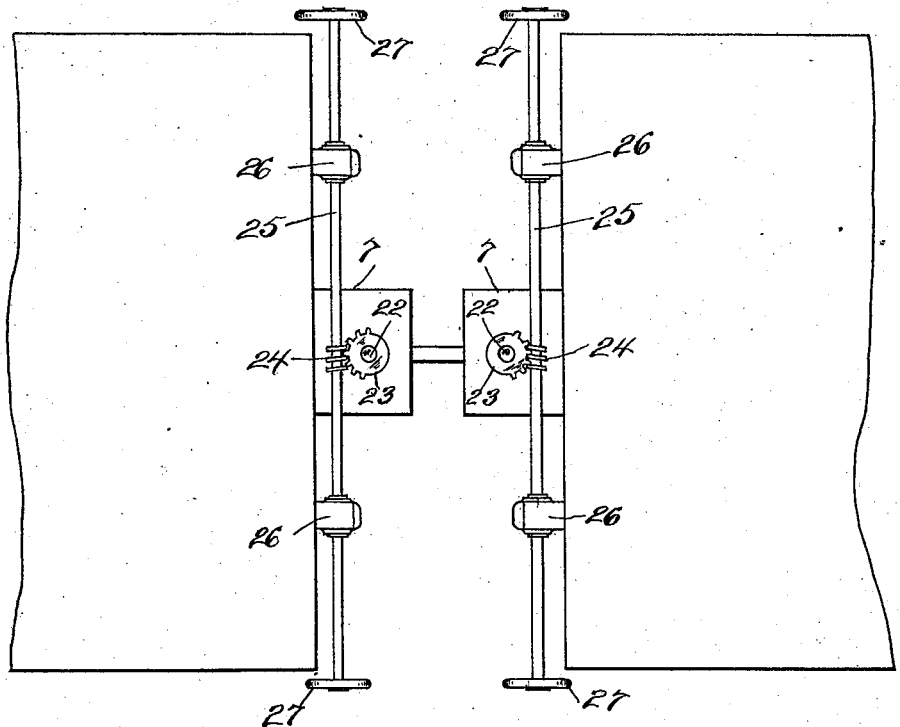

Figure 1 is a plan view of a portion of the ends of two cars which are coupled by our improved coupling device. Fig. 2 is a side view thereof; Fig. 3, a section on the line $x$ $x$ of Fig. 2, looking in the direction of the arrow $a$; Fig. 4, a section on the line $x$ $x$ of Fig. 2, looking in the direction of the arrow $b$; Fig. 5, a view similar to Fig. 1, showing a modified form of construction; and Fig. 6, a section of this construction similar to that of Fig. 3.

In the drawings forming part of this specification we have shown at 5 and 6 portions of the ends of two cars which are coupled by means of our improved automatic coupler, and in the practice of our invention we provide a coupler-head 7, and said head is provided with a central chamber 9, which opens outwardly, as shown at 11, and the ends of the side walls 10 of the chamber 9 are inwardly curved, as shown at 12.

Pivoted within the inwardly-directed ends 12 of the side walls 10 at each side of the coupler-head is a spring-operated dog 13, each of which is provided with a circular head 14, through which the pivot-pin passes, and said dogs or the free ends thereof are forced inwardly by strong spiral springs 16, and each of said dogs is provided at its inner or free end with an upwardly-directed shoulder or projection 17, which is formed on the outer side thereof.

The upper side or cover of the coupling-head 7, as shown in Fig. 4, is provided near the inner end thereof with a transverse chamber or cavity 18, in the opposite side walls of which, and near each end, are formed triangular notches or recesses 19, which are adapted to receive the ends of a dog 20, the diagonally-opposite corners of which are beveled or circular in form, as shown at 21.

The dog 20 is secured to the lower end of a shaft 22, which passes upwardly through the upper side or cover of the coupler-head 7, and said shaft may be continued upwardly, so as to be operated from the top of the car, or it may be operated by means of a gear-wheel 23, which is mounted thereon and which is adapted to be operated by a worm-gear 24, formed on a shaft 25, which is mounted in suitable bearings 26, secured to the car 6, said shaft being projected at one side of the car and provided with a handle or ring 27.

We also provide a coupling-bar 28, which is adapted to be mounted in suitable hangers 29, secured to the car 5, and said coupling-bar 28 is provided at its outer or free end with a triangular or other suitably-formed head 30, which is adapted to be passed into the coupler-head 7, between the dogs 13, the free ends of said dogs being forced outwardly thereby against the operation of the springs 16 until the head 30 of the coupling-bar has passed between said dogs, as clearly shown in Fig. 3, when the springs will force the free ends of the dogs inwardly, and the latter will securely hold the coupling-bar, as indicated in said figure.

The dog 20 on the lower end of the shaft 22 is secured in position in such manner that it passes transversely over the free ends of the dogs 13 and between the shoulders or projections 17, formed thereon, and the beveled or circular corners 21 thereof at the ends thereof will rest adjacent to the upwardly-directed shoulders or projections 17, formed on said dog, and said dogs or the free ends thereof may be forced outwardly, so as to release the head 30 of the coupling-bar by simply turning the shaft 22 in the proper direction, and this operation by which the cars are uncoupled may, as hereinbefore stated, be performed by means of the shaft 25 or by applying the hands directly to the shaft 22, which may be continued upwardly and provided with a suitable head for this purpose.

Figure 6:
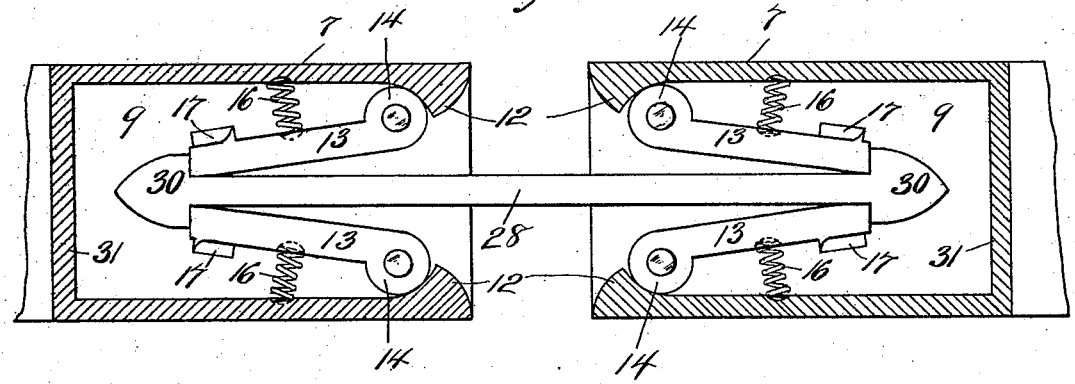

In Figs. 5 and 6 we have shown a modification of this construction, in which each of the cars is provided with one of the coupling-heads 7 at each end thereof and in this form of construction is double-headed or provided at each end with the triangular head 30, and each of the heads 7 is of the same construction, each being provided with the dogs 13, and the chambers 9 in the head 7 are provided with rear walls 31, which limit the backward movement of the coupling-bar 28 in either direction, and when this form of construction is employed it will be understood that one of the coupling-heads at one end of each car is provided with one of the coupling-bars 28, and all that is necessary to couple the cars is to run the same together in the usual manner. By means of this arrangement the cars may be quickly and easily coupled at either end, the coupling apparatus being precisely the same at both ends, and it will be understood that the means by which the dog 20 is operated is also the same as that hereinbefore described, the operating shafts or rods 25 and their connection with the shaft 22, on which the dog 20 is mounted, being clearly shown in Fig. 1. In this form of construction we have also shown the shaft 25 provided with a ring or handle 27 at each end thereof, and, although we have described this form of construction as a modification, it possesses, as will be readily understood, many advantages over that shown in Figs. 1 and 2, as the cars can be always quickly and easily coupled regardless of the position in which they are found or placed on the track. The coupling apparatus at each end being similar, the necessity for turning the cars is obviated.

This device is simple in construction and operation and perfectly adapted to accomplish the result for which it is intended, and the construction and operation of the various parts are such that they are not liable to get out of order or to be broken or fail to operate; and it is evident that changes in and modifications of the construction herein described may be made without departing from the spirit of our invention or sacrificing its advantages.

Having fully described our invention, we claim as new and desire to secure by Letters Patent—

1. In a coupling device for cars, the combination of a coupler-head adapted to be secured to a car, and in which is formed a chamber which opens outwardly, dogs pivoted at the sides of the opening in said chamber, the free ends of which are directed inwardly, and spring-operated, said free ends being also provided with upwardly-directed shoulders or projections, and a coupler-bar provided with a head which is adapted to be forced between the free ends of said dogs, and with which said dogs interlock, and means for disconnecting said dogs from the head of the coupler-bar, consisting of a transverse plate or dog having oppositely-beveled ends, and which is mounted on the lower end of a shaft which passes through the cover of the coupler-head, and which is adapted to operate in connection with said upwardly-directed shoulders or projections, said cover being provided in its under side with a transverse chamber or cavity which is adapted to receive said transverse plate or dog, and which is provided at its opposite sides, and near each end thereof, with notches or recesses which are adapted to receive the ends of said plate or dog, substantially as shown and described.

2. The herein-described automatic coupler for cars, which consists of similar coupling-heads connected with each end of each car, each coupler-head being provided with a central chamber which opens outwardly, and with a pair of pivoted spring-operated dogs, which project inwardly, and a coupler-bar provided with a head at each end, said heads being adapted to be forced between said dogs, and to be held thereby, and means for releasing said dogs, from said heads, consisting of a vertical shaft which passes through the top of each of the coupler-heads, and which is provided at its lower end with a transverse plate or dog, having beveled ends, and which is adapted to operate in connection with shoulders or projections formed on the dogs which hold the coupler-bars, substantially as shown and described.

3. The herein-described automatic coupler for cars, which consists of similar coupling-heads, connected with each end of each car, said coupling-head being provided with a central chamber which opens outwardly, and with a pair of pivoted spring-operated dogs, which project inwardly, and a coupling-bar provided with a head at each end, said heads being adapted to be forced between said jaws, and to be held thereby, and means for releasing said dogs from said heads when the cars are to be uncoupled, consisting of a vertical shaft which passes through the top of each of the coupler-heads, and which is provided at its lower end with a dog, which operates in connection with shoulders or projections formed on the dogs which hold the coupler-bars, and means for operating said shafts, on which said dogs are mounted, consisting of gear-wheels mounted thereon, and transverse rods or shafts, suitably supported and provided with worm-gears by which said wheels are operated, substantially as shown and described.

In testimony that we claim the foregoing as our invention we have signed our names, in presence of the subscribing witnesses, this 27th day of July, 1896.

CHARLES PAYNE.
JOHN LYNN.

Witnesses:
W. W. HILL,
CHARLES S. ROGERS.